(12) United States Patent
Sarkar et al.

(10) Patent No.: US 12,689,222 B2
(45) Date of Patent: Jul. 21, 2026

(54) INTELLIGENT SOURCE SWITCHING IN MICROGRID CONNECTED HOUSEHOLDS

(71) Applicant: Telefonaktiebolaget LM Ericsson (publ), Stockholm (SE)

(72) Inventors: Abhishek Sarkar, Bengaluru (IN); Aritra Sen, Kolkata (IN); Ashis Kumar Roy, Durgapur (IN); Dhiraj Nagaraja Hegde, Bengalore (IN); Helene Hallberg, Stockholm (SE); Tanmay Sen, Bithari West Bengal (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 18/688,403

(22) PCT Filed: Sep. 3, 2021

(86) PCT No.: PCT/EP2021/074328
§ 371 (c)(1),
(2) Date: Mar. 1, 2024

(87) PCT Pub. No.: WO2023/030638
PCT Pub. Date: Mar. 9, 2023

(65) Prior Publication Data
US 2024/0421607 A1 Dec. 19, 2024

(51) Int. Cl.
| | |
|---|---|
| *H02J 3/48* | (2026.01) |
| *H02J 3/00* | (2006.01) |
| *H02J 3/38* | (2006.01) |

(52) U.S. Cl.
CPC ................ *H02J 3/48* (2013.01); *H02J 3/003* (2020.01); *H02J 3/004* (2020.01); *H02J 3/381* (2013.01)

(58) Field of Classification Search
CPC .... H02J 3/48; H02J 3/003; H02J 3/004; H02J 3/381
(Continued)

(56) References Cited

U.S. PATENT DOCUMENTS

| | | |
|---|---|---|
| 2020/0083714 A1 | 3/2020 | Asawa |
| 2021/0003974 A1 | 1/2021 | Yang et al. |
| 2022/0179381 A1* | 6/2022 | Carrasco Schmidt ...................... G05B 19/042 |

OTHER PUBLICATIONS

International Search Report and Written Opinion mailed Jun. 20, 2022 in corresponding International Application No. PCT/EP2021/074328 (12 pages).
(Continued)

*Primary Examiner* — Richard Tan
(74) *Attorney, Agent, or Firm* — Rothwell, Figg, Ernst & Manbeck, P.C.

(57) ABSTRACT

The present disclosure relates to a method of controlling an energy supply system comprising a central power grid (40) and at least one local power grid configured to supply at least one entity (31*a*) with energy, and a device (30) performing the method. In an aspect, a method of controlling an energy supply system comprising a central power grid (40) and at least one local power grid configured to supply at least one entity (31*a*) with energy is provided. The method comprises acquiring (S101) information indicating, for a past time period, amount of energy having been supplied to the entity (31*a*) by the central power grid (40) and the at least one local power grid, energy supply capacity of the central power grid (40) and the at least one local power grid, and information indicating conditions affecting the energy supply and the energy capacity during said past time period and determining (S102), based on the acquired information, expected energy delivery capacity of the central power grid (40) and the at least one local power grid and expected energy
(Continued)

demand of the entity during an upcoming time period. The method further comprises controlling (S103) selection of amount of energy supplied from the central power grid (40) and from the at least one local power grid according to an energy criteria to be satisfied such that the expected energy demand of the entity (31*a*) is met during the upcoming time period.

17 Claims, 5 Drawing Sheets

(58) Field of Classification Search
      USPC ......................................................... 307/63
      See application file for complete search history.

(56)                    References Cited

OTHER PUBLICATIONS

Liu, et al., "Distributed Economic Dispatch in Microgrids Based on Cooperative Reinforcement Learning", IEEE Transactions on Neural Networks and Learning Systems, vol. 29, No. 6, Jun. 2018 (12 pages).
Dimeas, et al., "Multi-Agent Reinforcement Learning for Microgrids" Date of Conference: Jul. 25-29, 2010, Minneapolis, MN, USA (8 pages).
Neal, et al., "Reinforcement Learning Based Penetration Testing of a Microgrid Control Algorithm", Date of Conference: Jan. 27-30, 2021, NV, USA (7 pages).

* cited by examiner

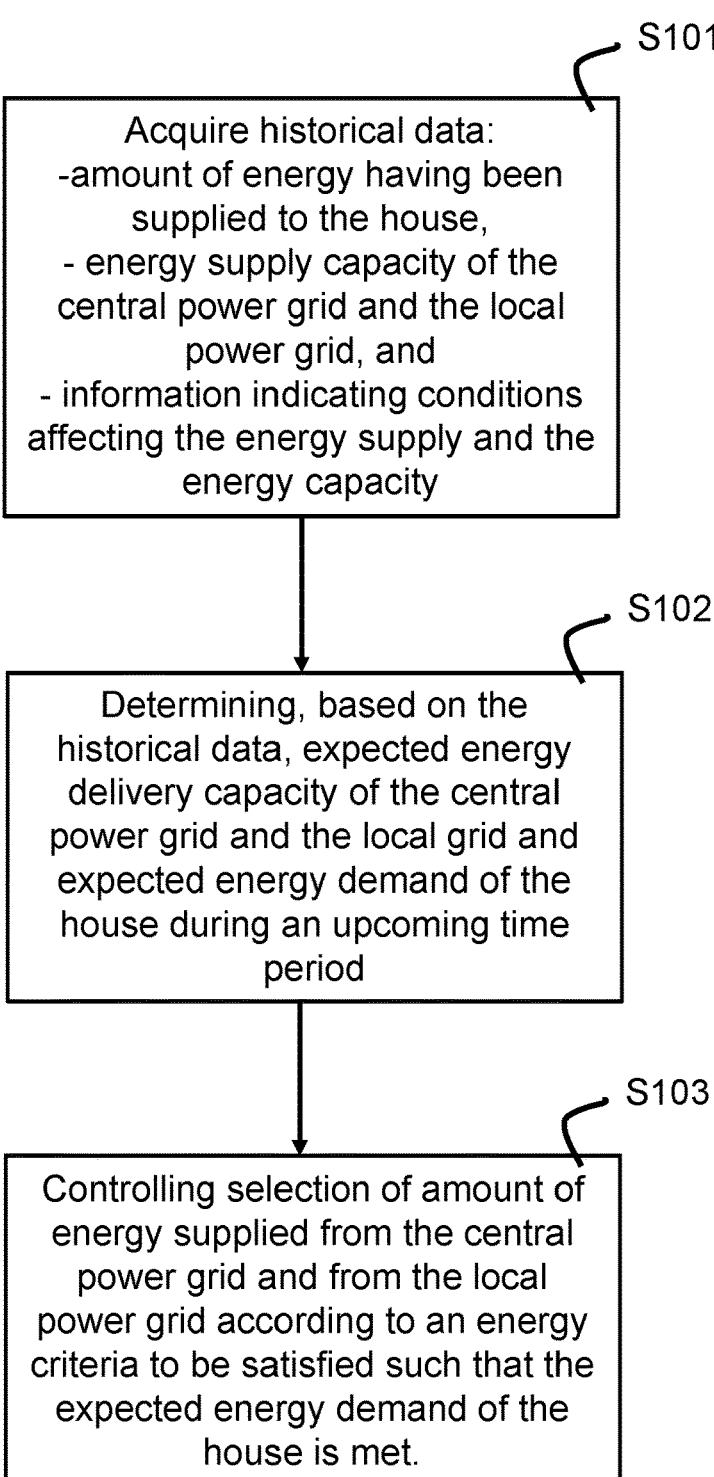

S101

Acquire historical data:
-amount of energy having been supplied to the house,
- energy supply capacity of the central power grid and the local power grid, and
- information indicating conditions affecting the energy supply and the energy capacity

S102

Determining, based on the historical data, expected energy delivery capacity of the central power grid and the local grid and expected energy demand of the house during an upcoming time period

S103

Controlling selection of amount of energy supplied from the central power grid and from the local power grid according to an energy criteria to be satisfied such that the expected energy demand of the house is met.

Fig. 4

INTELLIGENT SOURCE SWITCHING IN MICROGRID CONNECTED HOUSEHOLDS

CROSS REFERENCE TO RELATED APPLICATION(S)

This application is a 35 U.S.C. § 371 National Stage of International Patent Application No. PCT/EP2021/074328, filed Sep. 3, 2021, designating the United States.

TECHNICAL FIELD

The present disclosure relates to a method of controlling an energy supply system comprising a central power grid and at least one local power grid configured to supply at least one entity with energy, and a device performing the method.

BACKGROUND

Microgrids act as decentralized local sources of energy for individual households, communities and institutions. The microgrids can operate together with a central grid (also called macro-grid) or in an island mode where the micro-grids operate fully autonomously. Microgrids with renewable energy sources are becoming increasingly important from a global climate change perspective and increasing adoption rate of micro-grids in individual households, communities or institutions is envisaged. "Multi-Agent Reinforcement Learning for Microgrids" by Dimeas and Hatziargyriou, IEEE Xplore, discusses energy management in microgrids using machine learning.

Seasonally (winter/summer) as well as daily (day/night) changing environmental conditions also create a varying demand for electricity usage. In other words, the weather conditions and individual household preferences are dynamic, which must be considered when modelling a microgrid system. Sources of renewable energy like solar panels (as these panels are dependent on the light from the sun rather than the heat) and wind turbines can continue to work efficiently even during peak winters and even the power transmission loss decreases because of drop in resistance in the power transmitting cables, which should be taken into account when modelling a microgrid system.

Due to varying climatic conditions and demand of total energy, the microgrid system must be controlled accordingly. However, manual switching from the central grid to the microgrid or vice versa is possible when dealing with a smaller number of control parameters, but when there are numerous complex control parameters like e.g. fulfilling of demand-supply, dynamic pricing, reducing carbon footprint, etc, that the system must be capable of handling, manual intervention is not feasible and a more intelligent control mechanism must be provided.

SUMMARY

One objective is to solve, or at least mitigate, this problem in the art and thus to provide an improved method of controlling an energy supply system comprising a central power grid and one or more local power grids.

This objective is attained in a first aspect by a method of controlling an energy supply system comprising a central power grid and at least one local power grid configured to supply at least one entity with energy. The method comprises acquiring information indicating, for a past time period, amount of energy having been supplied to the entity by the central power grid and the at least one local power grid, energy supply capacity of the central power grid and the at least one local power grid, and information indicating conditions affecting the energy supply and the energy capacity during said past time period and determining, based on the acquired information, expected energy delivery capacity of the central power grid and the at least one local power grid and expected energy demand of the entity during an upcoming time period. The method further comprises controlling selection of amount of energy supplied from the central power grid and from the at least one local power grid according to an energy criteria to be satisfied such that the expected energy demand of the entity is met during the upcoming time period.

This objective is attained in a second aspect by a device configured to control an energy supply system comprising a central power grid and at least one local power grid configured to supply at least one entity with energy. The device comprises a processing unit and a memory, which memory contains instructions executable by the processing unit, whereby the device is operative to acquire information indicating, for a past time period, amount of energy having been supplied to the entity by the central power grid and the at least one local power grid, energy supply capacity of the central power grid and the at least one local power grid, and information indicating conditions affecting the energy supply and the energy capacity during said past time period and to determine, based on the acquired information, expected energy delivery capacity of the central power grid and the at least one local power grid and expected energy demand of the entity during an upcoming time period. Further, the device is operative to control selection of amount of energy supplied from the central power grid and from the at least one local power grid according to an energy criteria to be satisfied such that the expected energy demand of the entity is met during the upcoming time period.

Advantageously, a device referred to as a microgrid controller is configured to control, based on historical demand and ability of a grid to deliver energy, energy supply to an entity such as a house from a central grid and a local grid comprising renewable energy sources, according to a preferred energy criteria such that an upcoming energy demand of the house is satisfied.

Thus, the microgrid controller is configured to control selection of energy sources where energy subscribers have access to energy from both a central grid and from a local micro-grid generating power from one or more renewable energy sources. Together with the advent of smart central grids with dynamic pricing schemes to manage supply and demand, it will be important for a subscriber to decide which energy source to use at any given point in time and subscribers should also be able to switch between energy sources intelligently. Such energy subscriber—i.e. an energy subscriber which not only consumes energy from the central grid but further produces energy via a local grid—is commonly referred to as a prosumer.

This switching will in embodiments take into account parameters such as weather conditions, load on central grid, time of day, time of week, time of year, occurring blackouts and/or central grid maintenance, humidity, wind, surplus energy fed back to the central grid from prosumers, etc.

In an embodiment, the microgrid controller controls feedback of energy produced by the at least one local power grid to the central power grid. Hence, in case the energy subscriber is a prosumer which also is capable of feeding back locally produced (renewable) energy to the central grid, such capacity is taken into account. As is understood, energy fed back to the central grid may be consumed also by energy subscribers which do not have access to a local grid. Further, not all energy systems allow a prosumer to feedback locally produced energy to the central grid.

In an embodiment, the at least one local power grid comprises one or more renewable energy sources supplying the entity with energy.

In an embodiment, the one or more renewable energy sources comprises one or more of solar energy sources, wind energy sources, geothermal energy sources and hydropower energy sources.

In an embodiment, the at least one local power grid comprises one or more energy storage devices capable of storing energy produced by the renewable energy sources.

In an embodiment, the determining of expected energy delivery capacity further comprises taking into account expected weather conditions and/or planned power grid maintenance during the upcoming time period.

The microgrid controller may control supply of energy to hundreds or even thousands of entities. In an embodiment, a machine learning (ML) framework will be applied at the microgrid controller in order for the controller to be able to handle the resulting great amount of data being generated and the many parameters being evaluated for controlling selection of energy sources. In an embodiment, the ML framework is implemented by applying reinforcement learning (RL).

In a third aspect, a computer program is provided comprising computer-executable instructions for causing the device of the second aspect to perform the method of the first aspect when the computer-executable instructions are executed on a processing unit included in the device.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 4 illustrates a flowchart of a method performed by a microgrid controller of controlling an energy supply system comprising a central power grid and three local power grids configured to supply a respective household with energy;

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
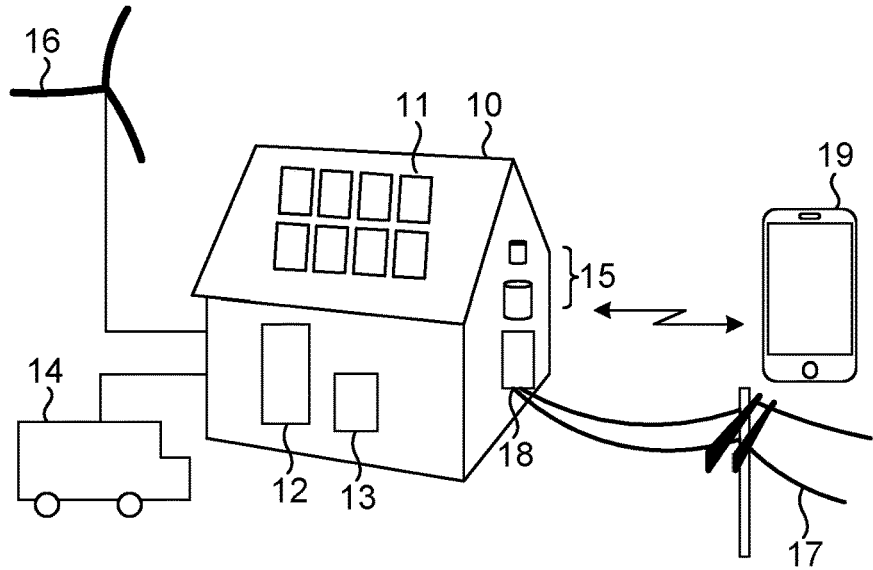
FIG. 1 illustrates a prior art microgrid system in which embodiments may be implemented.

FIG. 1 illustrates a prior art microgrid system in which embodiments may be implemented, where an entity such as a house 10 is equipped with roof-mounted solar panels 11 supplying household equipment such as a fridge 12 and a washing machine 13 and potentially also charging equipment for an electric vehicle 14 with energy via an energy conversion system 15. Further shown is a wind turbine 16 which may be used for the same purpose.

While a central grid 17 supplies the house 10 with energy, it may also be possible that some or all of the energy produced by the solar panels 11 and the wind turbine 16 are fed back to the central grid 17. For instance, if the household does not consume all produced wind and solar energy, the house owner may sell any surplus energy to other consumers by supplying the surplus energy to the central grid 17 for consumption at another place. Alternatively, any surplus energy may be stored at an appropriate energy storage for subsequent consumption at the house 10.

Further, it may be the case that the house owner remotely may control the system using a smart phone 19.

A consumer of energy which also produces energy as illustrated in FIG. 1 is commonly referred to as a prosumer.

Figure 2:
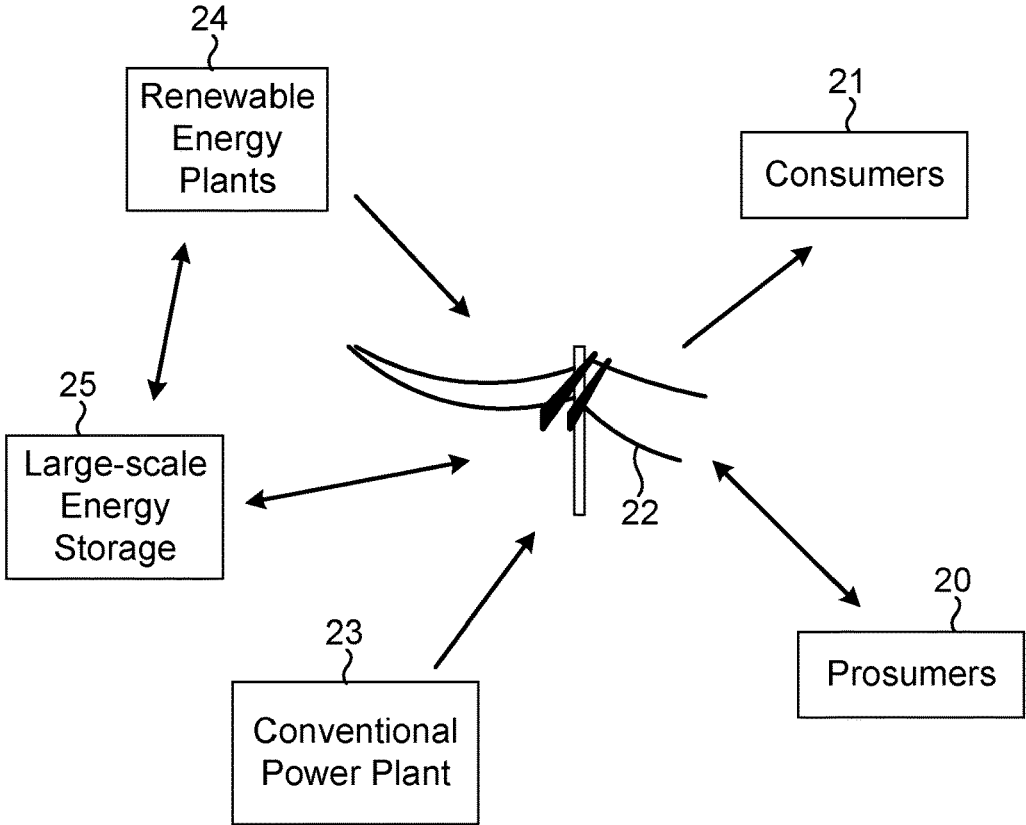
FIG. 2 illustrates prosumers/consumers connected to an energy supply system.

FIG. 2 illustrates prosumers 20 which consume as well as produces energy while consumers 21 only consumes energy. The prosumers 20 may thus feedback any locally produced energy to the central power grid 22 for consumption by the consumers 21, if allowed for technical and/or regulatory reasons. The central power grid 22 may in its turn receive power from a conventional power plant 23, a renewable energy plant 24 and/or energy storage 25.

As described, managing a microgrid system becomes complex with an ever increasing number of control parameters to consider. Therefore, an intelligent mechanism for controlling supply of energy to one or more entities is proposed based on energy demand of the entities.

As is understood, the entity being supplied with energy from the central power grid and a local power grid may be a household (or a group households on a particular premise), a radio site accommodating radio base stations and other equipment, a factory, a public building, etc.

Figure 3:
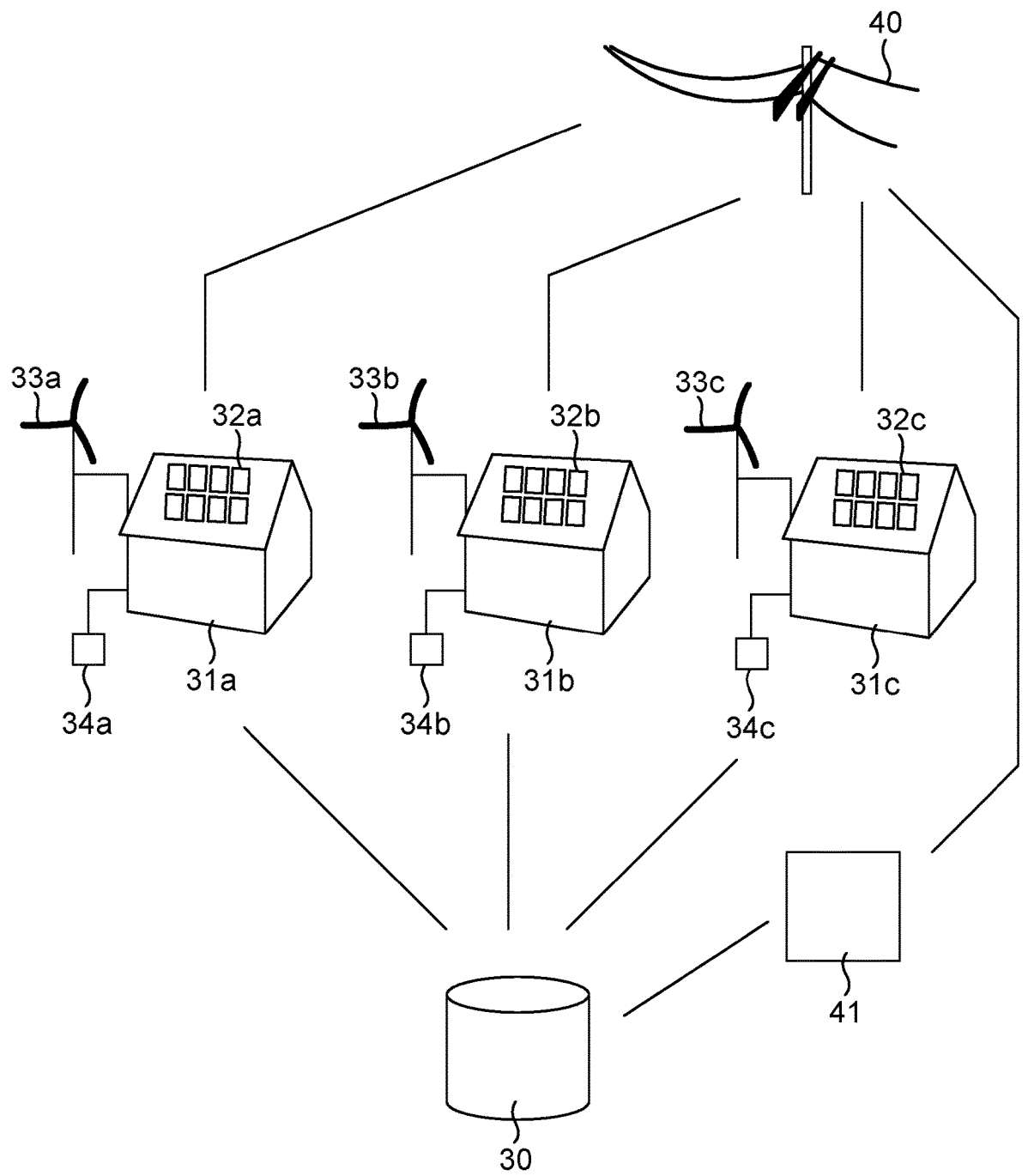
FIG. 3 illustrates a system where a microgrid controller according to an embodiment controls supply of energy to a group of households.

FIG. 3 illustrates a system where a microgrid controller 30 according to an embodiment controls supply of energy to a group of households 31a, 31b, 31c each being connected to the central power grid 40 and a local power grid referred to as a microgrid. In this exemplifying embodiment, the microgrid of each household 31a, 31b, 31c is comprises a solar energy source 32a, 32b, 32c and a wind energy source 33a, 33b, 33c, respectively. Oher sources of renewable energy such as geothermal energy from heat inside the earth or hydropower from flowing water may be envisaged. As is understood, the microgrid controller 30 may in practice control energy supply to hundreds or even thousands of entities.

Further, each household 31a, 31b, 31c may comprise a local energy storage 34a, 34b, 34c, where surplus renewable energy is stored for later use.

FIG. 4 illustrates a flowchart of a method performed by the microgrid controller 30 of controlling the energy supply system comprising the central power grid 40 and the three local power grids (equipped with solar 32a, 32b, 32c and wind 33a, 33b, 33c energy sources) configured to supply the respective house 31a, 31b, 31c with energy.

The microgrid controller 30 is thus typically capable of communicating with each individual entity 31a, 32a, 33a and further a central power grid operator 41 in order to be able to control selection of energy source and to acquire information controlling the selection.

Further, the microgrid controller 30 may communicate with other microgrid controllers which are configured to control selection of energy sources for other entities (which is not shown in FIG. 3); a group of microgrid controllers may interoperate to cover a great geographical area comprising a huge number of different entities.

In the following exemplifying embodiment, control of energy supply to the first house 31a will be described in detail. As is understood, the same process may simultaneously be performed for the second house 31b and the third house 31c In order to determine the upcoming energy demand of the first house 31a, the microgrid controller 30 acquires information in a first step S101 indicating, for a past time period:

a) amount of energy having been supplied to the house 31a by the central power grid 40 and the local power grid 32a, 33a;

b) energy supply capacity of the central power grid 40 and the local power grid 32a, 33a; and c) information indicating conditions affecting the energy supply and the energy capacity during the past time period.

As is understood, the historical data acquired may extend over a long time period, such as weeks, months or even years. The historical data may be stored locally at each entity and/or at a central storage held by a central power grid operator.

Based on the acquired historical data, the microgrid controller 30 determines in step S102, for an upcoming time period:

d) expected energy delivery capacity of the central power grid 40 and the local power grid 32a, 33a; and e) expected energy demand of the house 31a.

Step S102 may be referred to as a data mining and energy usage analysis step.

A number of parameters may be analysed in this step. Further, when determining energy demand of the first house 31a, it may further be necessary to take into account energy demand of the second house 31b and the third house 31c, as these demands may affect central grid load and thus capacity.

For instance, the following parameters may be analysed in step S102 for an upcoming time period, such as the next coming hour:

$D_g$: total central grid energy demand, $S_g$: total energy supply capacity of central grid, $D_r$=total renewable energy demand, $S_r$=total renewable energy supply capacity of all the renewable energy sources, $N_p$=number of prosumers connected to the microgrid controller, $N_c$=number of consumers connected to the microgrid controller, $E_g$=average central grid energy consumption by each entity, and $E_r$=average renewable energy consumption by each entity.

In an example, the microgrid controller 30 determines in step S102—based on the historical data acquired in step S101—that for the next upcoming hour, say 14:00-15:00 on a Wednesday for a given weather condition ("sunny, light wind"), the first house 31a usually has an energy demand of 2 kWh as indicated by the energy that in fact has been delivered to the entity historically between 14:00 and 15:00 on Wednesdays under sunny conditions.

As is understood, the microgrid controller 40 would typically estimate upcoming weather by attaining a weather forecast from an appropriate provider and any length of the upcoming time period may be envisaged such as 1 hour, 2 hours, 6 hours, etc.

However, the information indicating conditions historically affecting the energy capacity that was acquired in step S101 indicates that between 14:00 and 15:00 on Wednesdays, the load on the central grid is high and the central grid thus only has capacity to deliver 1 kWh (this may be the case regardless of weather conditions).

Hence, in order to meet the estimated energy demand of the first house 31a (which amounts to 2 kWh during the upcoming hour), the local power grid 32a, 33a must be capable of producing 1 kWh.

Further, the information indicating conditions historically affecting the energy capacity that was acquired in step S101 indicates that between 14:00 and 15:00 on Wednesdays, the solar panels 32a has an expected energy supply capacity of, say, 1.4 kWh in case of sunny weather, while the wind turbine 33a has an expected energy supply capacity of 0.4 kWh in case of light wind.

Based on these estimations, the microgrid controller 30 controls in step S103 selection of amount of energy supplied from the central power grid 40 and from the local power grid 32a, 33a according to an energy criteria to be satisfied such that the expected energy demand of the first house 31a is met.

In this exemplifying embodiment, the energy criteria "use as much renewable energy as possible" is evaluated, and the microgrid controller 30 thus selects the solar panels 32a and the wind turbine 33a to deliver in full, i.e. 1.4+0.4=1.8 kWh, while controlling the central grid 40 to deliver only 0.2 kWh, thereby satisfying the 2-kWH demand of the house 31a.

In another example, the upcoming weather conditions are instead "cloudy, strong wind", and the microgrid controller 40 determines in step S102 (from the historical data acquired in step S101) that under these particular conditions, the solar panels 32a instead has an expected energy supply capacity of 0.2 kWh, while the wind turbine 33a now has an expected energy supply capacity of 2.1 kWh.

The microgrid controller 30 thus controls the energy supply in step S103 such that 2 kWh is delivered to the house 31a from the local grid, for instance 0.2 kWh from the solar panels 32a and 1.8 kWh from the wind turbine 33a, while no energy is delivered to the house 31a from the central grid 40. In addition, 0.3 kWh of surplus energy produced by the wind turbine 33a may be fed back to the central grid 40 and thus delivered to another entity if required.

For instance, the microgrid controller 30 may conclude that the second house 31b indeed requires a further 0.2 kWh for its energy demand to be met, in which case the microgrid controller 30 may inform a central power grid operator that at least part of the energy fed back to the central grid 40 from the first house 31a should be delivered to the second house 31b.

In yet another example, the information acquired in step S101 indicates that on Wednesdays between 14:00 and 15:00, the central power grid 40 typically suffers from blackouts in this particular area and thus commonly cannot deliver energy at all. In such a scenario, the microgrid controller 40 may control-even if in step S102 the energy demand is still determined to be 2 kWh—the solar panels 32a and the wind turbine 33a to deliver all energy to the house 31a even if such supply is less than 2 kWh. In such a scenario, the microgrid controller 30 may thus conclude that no energy will be delivered from the central power grid 40 during the next upcoming hour.

Further, in such an example, the microgrid controller 30 may conclude that e.g. in the preceding hour, i.e. 13:00-1400, no surplus renewable energy should be fed back to the central power grid 40 but instead stored in a local energy storage for later use since there is a risk that the upcoming energy demand of the house 31 between 14:00 and 15:00 otherwise cannot be met. Such storage may thus facilitate meeting the upcoming energy demand.

Advantageously, the microgrid controller 30 according to embodiments is configured to control, based on historical demand and ability to deliver energy, energy supply to the house 31a from the central grid 40 and the local grid 32a, 33a according to a preferred energy criteria such that an upcoming energy demand of the house 31a is satisfied.

Thus, the microgrid controller 30 is configured to control selection of energy sources where energy subscribers, i.e. prosumers, have access to energy from both a central grid and from a local micro-grid generating power from one or more renewable energy sources. Together with the advent of smart central grids with dynamic pricing schemes to manage supply and demand, it will be important for a subscriber to decide which energy source to use at any given point in time and subscribers should also be able to switch between energy sources intelligently.

This switching will take into account parameters such as weather conditions, load on central grid, time of day, time of week, time of year, occurring blackouts and/or central grid maintenance, humidity, wind, surplus energy fed back to the central grid from prosumers, etc.

The switching may further take into account various indices such as Customer Average Interruption Duration Index (CAIDI), System Average Interruption Duration Index (SAIDI), Momentary Average Interruption Frequency Index (MAIFI), System Average Interruption Frequency Index (SAIFI), etc.

There are numerous advantages associated with the embodiments described herein, as will be listed in the following.

1. Stabilizing energy demand-supply.
2. Prosumers will have flexibility of choosing energy sources, and possibly also feeding back any locally produced surplus energy to the central grid.
3. Optimized resource allocation may be achieved within the community served by the microgrid controller(s).
4. Peak hour energy consumption may be mitigated by controlling supply and demand of electricity in an area.
5. Central grid in many developed European countries (e.g. Sweden) is using hydropower and nuclear, which provides for a very low carbon footprint. In many grids, coal and fossil fuel is used, which causes high carbon emission. Sometimes the grid can have mix of high and low carbon. By adopting the solution set forth herein, carbon footprint can be reduced wherever required.
6. Energy source-switching is enabled in smart home solutions.
7. The selection between central grid and local grid reduces level of peak hour-usage and eventually provides for a healthier energy transmission network and reduces maintenance.
8. The occurrence of power failures are reduced since the energy subscribers need not rely solely on the central power grid.
9. The need for a high-availability central grid is produced.
10. Sustainability is increased.

As previously mentioned, the microgrid controller 30 may control supply of energy to hundreds or even thousands of entities. In an embodiment, a machine learning (ML) framework will be applied at the microgrid controller 30 in order for the controller to be able to handle the resulting great amount of data being generated and the many parameters being evaluated for controlling selection of energy sources.

Reinforcement Learning (RL) is a flexible framework that applies data driven optimization to control problems. It is based on an agent's interaction with an environment, where the RL agent visits states of the environment, executes actions, and receives rewards for such actions. In embodiments of the invention, so-called meta RL may be applied to handle the continuously changing environment.

Applying RL as ML framework at the microgrid controller 30 may in an embodiment imply that each individual entity 31a, 32a, 33a is view upon as its own environment and for each environment/entity, an RL agent is trained using the previously described historical data and evaluating upcoming energy demands in order to be able to make informed decisions on the selection of energy sources to satisfy the upcoming energy demands.

The goal of RL is to find a policy that optimizes a value function. The value function is a mapping between the different states and the expected rewards, also known as the expected return. An optimal policy selects actions that lead to a state with the highest expected return.

Figure 5:
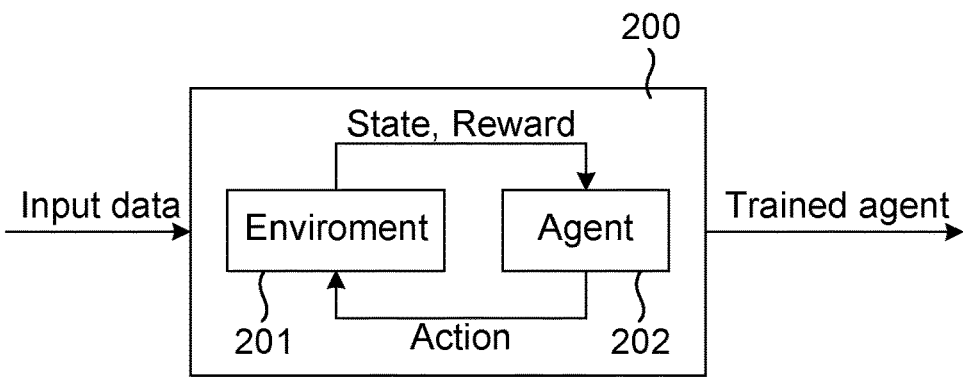
FIG. 5 illustrates a reinforcement learning (RL) process deployed for creating and training an RL agent according to an embodiment.

FIG. 5 illustrates an RL process 200 deployed for creation and training of an RL agent 202 to subsequently be used for controlling selection of energy sources at the house 31a represented by the environment 201. As is understood, the RL process 200 is performed for each respective house 31a, 31b, 31c. In other worlds, an RL agent is trained for each environment, i.e. each house 31a, 31b, 31c. One common algorithm applied by RL agents is the so-called Deep Q-Network (DQN) RL algorithm.

Figure 6:
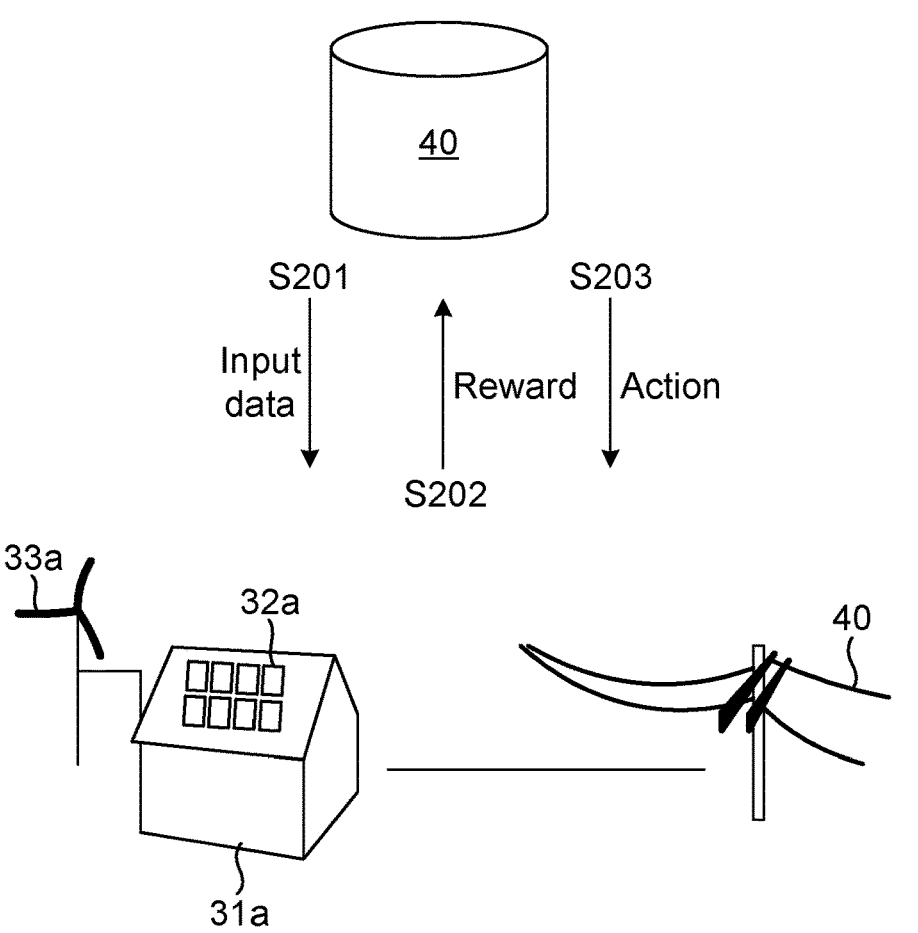
FIG. 6 illustrates interaction between a microgrid controller of an embodiment and an entity during an RL process.

Reference is further made to FIG. 6 showing interaction between the microgrid controller 40 and the first house 31a during the RL process 200.

The first house 31a is thus represented by the environment 201, to which the microgrid controller 40 sends input data in step S201, which hence practically constitutes a training signal for the RL agent 202 (via the response of the environment 201). The input data may indicate e.g. current source of energy, weather conditions, time of day, etc. The house 31a will return a reward in step S202 indicating how well the environment 201 responds to the input data. As is understood, in a training phase, a large amount of (sets of) input data may be supplied to the environment 201 in order to appropriately train the RL agent 202.

The environment 201 (i.e. the first house 31*a*) thus returns a reward for each set of input data being supplied to the RL process 200 and the agent 202 at the microgrid controller 40 will accordingly take appropriate action in terms of controlling selection of amount of energy supplied from the central power grid 40 and from the energy sources 32*a*, 33*a* of the local power grid at the house 31*a* according to an energy criteria to be satisfied such that the expected energy demand of the entity 31*a* is met, as previously discussed with reference to step S103.

These actions will thus be fed back in step S203 from the agent 202 located at the microgrid controller 40 to the environment 201 (i.e. the house 31*a*) for each reward received. Such actions may include one or more or of select central grid or local grid, feedback surplus renewable energy to central grid, store renewable energy in local storage, consume energy from local storage, etc.

To conclude, the RL agent 202 is trained based on the input data supplied to the environment 201, and actions are taken by the RL agent 202 in the environment 201 to arrive at an optimal policy regarding energy source selection to be performed for said environment 201. As is understood, the house 31*a* may ignore the instruction of energy source usage alerted by the microgrid controller 40 or simply overrule the instruction. Such behaviour would be observed by the agent 202.

Ultimately, the trained RL agent 200 may be used at the microgrid controller 40 to find an optimal regime for controlling selection of energy sources at the entities 31*a*, 31*b*, 31*c*. Once an appropriately trained RL agent 202 has been attained, instructions may be provided by the microgrid controller 40 to the trained RL agent 202 to ensure that a desired result is arrived at before the instructions are provided the first house 31*a*. In line with the previously described example, the microgrid controller 40 may use the trained RL agent to determine power control strategy for the upcoming hour 14:00-15:00 on a Wednesday at a certain forecasted weather condition.

The actual environment 201 is determined by factors such as the weather conditions, number of people residing in the first house 31*a* and their consumption patterns. Thus, the environment 201 in which the RL agent 202 is trained may be continuously and slowly changing, hence the RL agent 202 may need to continuously change its policy and be further trained.

Further, in a multi-agent setting, the policy of an agent depends on the policy of other agents. While three entities 31*a*, 31*b*, 31*c* are illustrated in FIG. 3, the microgrid controller 40 may in practice control hundreds or even thousands of entities. One approach to deal with such multi-agent setting is to implement a so-called "forget" approach, wherein the RL agent 202 continuously receives recent observations of other agents and updates its policy.

Again with reference to FIGS. 5 and 6, rewards sent in step S202 from the first house 31*a* to the microgrid controller 40 is an indication of how well the actions of the agent 202 supplied to the first house 31*a* in step S203 complies with the RL policy to be attained given the input data of step S201.

Illustrated below is an example of a reward function that could be used to calculate total reward:

$$reward = f(X_1, X_2, X_3 \ldots X_n; W_1, W_2 \ldots W_m),$$

where X are values of input variables and W are weight values which are configurable parameters.

The above function provides the flexibility to calculate total reward dynamically based on multiple factors. The simplest form of a reward function can be linear in all the features which takes in weightage parameters along with respective parameters and returns total calculated reward. This function can be changed according to the need that may vary from subscriber to subscriber.

An example reward for a single subscriber may be defined as follows:

$$W_1*X_1 + W_2*X_2 + W_3*X_3 + W_4*X_4 + W_5*X_5 + W_6*X_6,$$
where $X_1$=Energy consumption in kWh,
$X_2$=Emission of carbon footprint,
$X_3$=Power outages in minutes,
$X_4$=Voltage stability,
$X_5$=Amount of energy fed back to the central grid in kWh (if applicable; for a pure consumer this is zero),
$X_6$=Reactive power in kWh,
$W_1 \ldots W_6$=Weights associated with each of the input variables or factors $X_1 \ldots X_6$
This is equivalent to:

$$R = \sum_1^n W_i * X_i$$

where n=total number of factors included in the reward function.

Each of the $X_i$ has different scales, which can create instability during the optimization process (reward maximization process). To avoid this instability, it is possible to normalize each $X_i$ using their respective mean ($\mu_i$) and standard deviation ($\sigma_i$) using the normalization formula $X_i = (X_i - \mu_i)/\sigma_i$.

As previously described, the idea is to maximize the reward in order to arrive at a trained RL agent 202 complying with the set RL policy of the RL process 200.

The reward generated by each entity in this example utilizes weights W for all factors X of the all the factors-based on user requirement. For instance:

if the user prioritizes cost factor, higher weightage is attached to the cost incurred per unit of electricity consumption in kWh, if carbon footprint minimization is the priority as per the local government policy, then higher weights are associated with that factor, once the agent takes any actions which results in outage then such actions will receive high negative reward, every action taken by the agent must meet the load requirements at the subscriber end which will ensure stability in terms of grid load/voltage, and rewards may also take in consideration the incentives of a subscriber of selling back the excess renewable energy to the central grid.

The states of the environment 201 visited by the RL agent 202 is a result of the input data being supplied by the microgrid control 40 to the first house 31*a* in step S201.

As a simple example, consider the following input data is supplied to the environment 201 of the RL process 200:

1) Current source of energy,
2) Time of day,
3) Day of week,
4) Current load of the central grid,
5) Weather,
  a) Temperature,
  b) Humidity,
  c) Wind speed,
6) Main outage prediction, 7) Predicted load, and 8) Own power available.

Given these, an example state as perceived by the RL agent 202 may have the following appearance:

Current source of energy: "Main grid",

Time of day: "Morning",

Day of week: "Sunday",

Current load of the central grid: "High",'

Weather

Temperature: "Low",

Humidity: "Medium",

Wind speed: "High",

Main outage prediction: "Grid failure",

Predicted load: "High", and

Own power available: "Yes".

Figure 7:
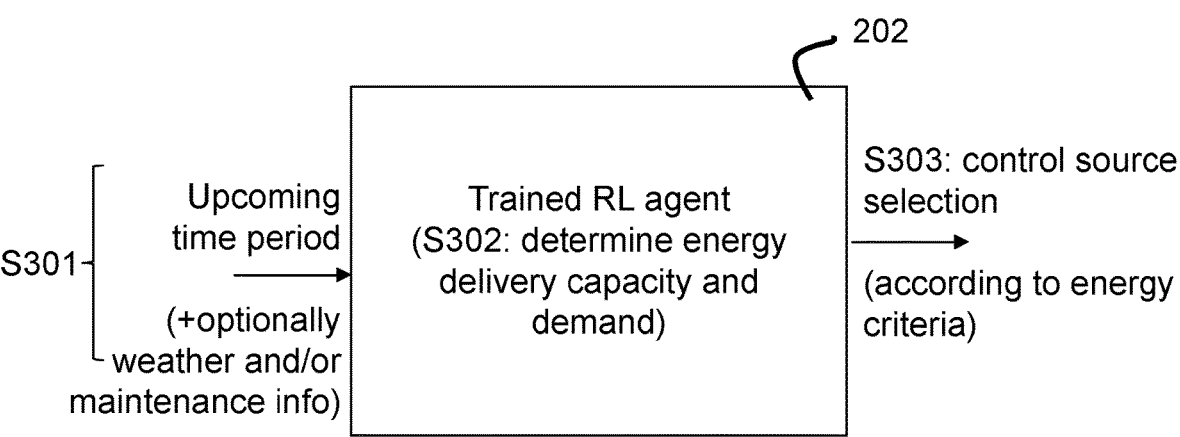
FIG. 7 illustrates deployment of a trained RL agent at the microgrid controller for controlling a respective entity according to an embodiment.

FIG. 7 illustrates deployment of the trained RL agent 202 at the microgrid controller 40 for controlling the respective entity 31a, 31b, 31c.

Thus, after having trained the RL agent 202 utilizing the RL process 200 for each entity 31a, 31, 31c as previously described, the microgrid controller 40 will utilize he trained RL agent 202 to control the selection of energy at the respective entity 31a, 31, 31c.

In step S301, the microgrid controller 30 supplies to the trained RL agent 202 with information indicating an upcoming time period during which the houses 31a, 31b, 31c are to be controlled. Further in step S301, expected weather conditions for the upcoming period and other useful information such as planned maintenance of the central grid or any local grid may be included with the information.

Now, as described during the training of the RL agent 202 historical data was supplied to RL agent indicating:

amount of energy having been supplied to the house 31a by the central power grid 40 and the local power grid 32a, 33a;

energy supply capacity of the central power grid 40 and the local power grid 32a, 33a; and information indicating conditions affecting the energy supply and the energy capacity during the past time period, e.g. weather conditions, time of day, grid maintenance, etc.

As a result, the trained RL agent 202 computes in step S302—given the indicated time period of S301 and optionally expected weather conditions and/or planned maintenance:

expected energy delivery capacity of the central power grid 40 and the local power grid 32a, 33a;

expected energy demand of the house 31a; and further optionally energy demand of the second house 31b and the third house 31c, and ability of any of the houses 31a, 31b, 31c to feedback renewable energy to the central grid 40.

Finally in step S303, the microgrid controller 30 controls-based on the computations of the trained RL agent 202-selection of amount of energy supplied from the central power grid 40 and from the sources 32a, 33a of the local power grid according to an energy criteria to be satisfied such that the expected energy demand of the first house 31a is met for the upcoming time period.

As is understood, the microgrid controller 30 controls the energy being supplied to the second house 31b and the third house 31c accordingly using the trained RL agent for each of the second house 31b and the third house 31c such that the expected energy demand of those two houses are met as well.

Figure 8:
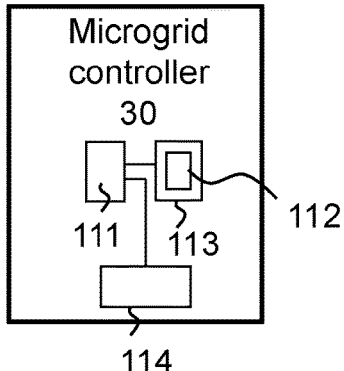
FIG. 8 illustrates a microgrid controller according to an embodiment.

FIG. 8 illustrates a device 30 referred to as a microgrid controller configured to controlling an energy supply system comprising a central power grid and one or more local power grids configured to supply one or more entities with energy, where the steps of the method performed by the microgrid controller 30 in practice are performed by a processing unit 111 embodied in the form of one or more microprocessors arranged to execute a computer program 112 downloaded to a storage medium 113 associated with the microprocessor, such as a Random Access Memory (RAM), a Flash memory or a hard disk drive. The processing unit 111 is arranged to cause the microgrid controller 30 to carry out the method according to embodiments when the appropriate computer program 112 comprising computer-executable instructions is downloaded to the storage medium 113 and executed by the processing unit 111. The storage medium 113 may also be a computer program product comprising the computer program 112. Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc. The microgrid controller 30 further comprises a communication interface 114 (wired or wireless) over which it is configured to transmit and receive data.

The device 30 of FIG. 8 may be provided as a standalone device or as a part of at least one further device. For example, the device 30 may be provided in a node of a core network, or in an appropriate device of a radio access network (RAN), such as in a radio base station in communication with entities to which energy is supplied, in an internet server, etc. Alternatively, functionality of the device 30 may be distributed between at least two devices, or nodes. These at least two nodes, or devices, may either be part of the same network part (such as the core network) or may be spread between at least two such network parts.

Thus, a first portion of the instructions performed by the device 30 may be executed in a first device, and a second portion of the of the instructions performed by the device 30 may be executed in a second device; the herein disclosed embodiments are not limited to any particular number of devices on which the instructions performed by the device 30 may be executed.

Hence, the method according to the herein disclosed embodiments are suitable to be performed by a device 30 residing in a cloud computational environment. Therefore, although a single processing circuitry 111 is illustrated in FIG. 8, the processing circuitry 111 may be distributed among a plurality of devices, or nodes. The same applies to the computer program 112. Embodiments may be entirely implemented in a virtualized environment.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of controlling an energy supply system comprising a central power grid and at least one local power grid configured to supply at least one entity with energy, comprising:

acquiring information indicating, for a past time period, amount of energy having been supplied to the at least one entity by the central power grid and the at least one local power grid, energy supply capacity of the central power grid and the at least one local power grid, and information indicating conditions affecting energy supply and energy capacity during said past time period;

training a machine learning, ML, model with the acquired information;

supplying the trained ML model with information indicating an upcoming time period;

computing, by the trained ML model, expected energy delivery capacity of the central power grid and the at least one local power grid and expected energy demand of the at least one entity during the upcoming time period; and controlling selection of amount of energy supplied from the central power grid and from the at least one local power grid according to an energy criteria to be satisfied such that the expected energy demand of the at least one entity is met during the upcoming time period based on the computation of the trained ML model, wherein the ML model is trained by applying reinforcement learning, RL, and the trained ML model is an RL agent used for controlling the selection of one or more energy sources supplying the at least one entity with energy.

2. The method of claim 1, wherein the controlling of selection of amount of energy supplied further comprises:

controlling feedback of energy produced by the at last one local power grid to the central power grid.

3. The method of claim 1, the at least one local power grid comprising one or more renewable energy sources supplying the at least one entity with energy.

4. The method of claim 3, the one or more renewable energy sources comprising one or more of solar energy sources, wind energy sources, geothermal energy sources and hydropower energy sources.

5. The method of claim 3, the at least one local power grid comprising one or more energy storage devices capable of storing energy produced by the one or more renewable energy sources.

6. The method of claim 1, the information indicating conditions affecting the energy supply and the energy capacity comprising one or more of weather conditions, load on the central power grid, time of day, time of week, time of year, occurred central power grid blackouts and/or maintenance.

7. The method of claim 1, the computing further comprising taking into account expected weather conditions and/or planned power grid maintenance during the upcoming time period.

8. The method of claim 1, wherein a plurality of entities are to be supplied with energy, each entity being supplied with energy from the central power grid and a respective local power grid, the controlling of the selection of amount of energy supplied comprises controlling selection of amount of energy supplied from the central power grid and from the respective local power grid according to an energy criteria to be satisfied such that the expected energy demand of each entity is met.

9. A non-transitory computer program product comprising a non-transitory computer readable medium storing a computer program comprising computer-executable instructions for causing a device to perform the method of claim 1 when the computer-executable instructions are executed on processing circuitry included in the device.

10. A device configured to control an energy supply system comprising a central power grid and at least one local power grid configured to supply at least one entity with energy, said device comprising a processing circuitry and a memory, said memory containing instructions executable by said processing circuitry, whereby the device is operative to:

acquire information indicating, for a past time period, amount of energy having been supplied to the at least one entity by the central power grid and the at least one local power grid, energy supply capacity of the central power grid and the at least one local power grid, and information indicating conditions affecting energy supply and energy capacity during said past time period;

train a machine learning, ML, model with the acquired information;

supply the trained ML model with information indicating an upcoming time period;

compute, by the trained ML model, expected energy delivery capacity of the central power grid and the at least one local power grid and expected energy demand of the at least one entity during the upcoming time period; and control selection of amount of energy supplied from the central power grid and from the at least one local power grid according to an energy criteria to be satisfied such that the expected energy demand of the at least one entity is met during the upcoming time period based on the computation of the trained ML model, wherein the ML model is trained by applying reinforcement learning, RL, and the trained ML model is an RL agent used for controlling selection of one or more energy sources supplying the at least one entity with energy.

11. The device of claim 10, further being operative to, when controlling selection of amount of energy supplied:

control feedback of energy produced by the at least one local power grid to the central power grid.

12. The device of claim 10, the at least one local power grid comprising one or more renewable energy sources supplying the at least one entity with energy.

13. The device of claim 12, the one or more renewable energy sources comprising one or more of solar energy sources, wind energy sources, geothermal energy sources and hydropower energy sources.

14. The device of claim 12, the at least one local power grid comprising one or more energy storage devices capable of storing energy produced by the one or more renewable energy sources.

15. The device of claim 10, the information being configured to indicate conditions affecting the energy supply and the energy capacity comprising one or more of weather conditions, load on the central power grid, time of day, time of week, time of year, occurred central power grid blackouts and/or maintenance.

16. The device of claim 10, further being operative to, when computing the expected energy delivery capacity, taking into account expected weather conditions and/or planned power grid maintenance during the upcoming time period.

17. The device of claim 10, the ML model being trained by applying the reinforcement learning, RL.

* * * * *